(12) United States Patent
Welti et al.

(10) Patent No.: US 9,933,995 B2
(45) Date of Patent: Apr. 3, 2018

(54) HEADPHONES WITH INTEGRAL IMAGE DISPLAY

(71) Applicant: HARMAN INTERNATIONAL INDUSTRIES, INC., Stamford, CT (US)

(72) Inventors: Todd Welti, Stamford, CT (US); Elisabeth McMullin, Stamford, CT (US)

(73) Assignee: HARMAN INTERNATIONAL INDUSTRIES, INCORPORATED, Stamford, CT (US)

( * ) Notice: Subject to any disclaimer, the term of this patent is extended or adjusted under 35 U.S.C. 154(b) by 207 days.

(21) Appl. No.: 14/616,729

(22) Filed: Feb. 8, 2015

(65) Prior Publication Data

US 2016/0216943 A1    Jul. 28, 2016

Related U.S. Application Data

(60) Provisional application No. 62/107,476, filed on Jan. 25, 2015.

(51) Int. Cl.
*G06F 3/16* (2006.01)
*H04R 1/10* (2006.01)
(Continued)

(52) U.S. Cl.
CPC .............. *G06F 3/167* (2013.01); *G06F 1/163* (2013.01); *G06F 3/0488* (2013.01); *H04R 1/028* (2013.01); *H04R 1/1041* (2013.01); *H04R 5/033* (2013.01); *H04R 1/105* (2013.01); *H04R 1/1008* (2013.01); *H04R 1/1066* (2013.01); *H04R 5/0335* (2013.01); *H04R 2201/107* (2013.01); *H04R 2420/07* (2013.01); *H04R 2430/01* (2013.01)

(58) Field of Classification Search
CPC .. H04M 1/6058; H04M 2250/22; H04M 1/05; H04M 1/6066; H04M 1/7253; H04M 2250/02
See application file for complete search history.

(56) References Cited

U.S. PATENT DOCUMENTS

| | | | |
|---|---|---|---|
| 8,842,850 B2 * | 9/2014 | Akaike | H04R 1/1041 381/309 |
| 2009/0243966 A1 * | 10/2009 | Kato | G02B 27/017 345/8 |

(Continued)

OTHER PUBLICATIONS

HALO Wireless Interactive Headphones With Detachable Digital Audio Player. by Tuvie, Internet Wayback Archive. Apr. 2014. 14 pages.*

(Continued)

*Primary Examiner* — Hien L Duong
(74) *Attorney, Agent, or Firm* — Artegis Law Group, LLP

(57) ABSTRACT

Method and system for displaying images on headphones worn by a user and/or for displaying a status of the user. The headphones include a display screen on an outward-facing surface of the headphones. The display screen can display images related to audio being listened to by the user. The display screen can also display a status of the user, such as "on the phone" or "busy." The display screen can be a touch screen display, and the user can input commands to the headphones by touching and/or gesturing on the display.

18 Claims, 5 Drawing Sheets

(51) Int. Cl.
  *H04R 5/033*   (2006.01)
  *G06F 1/16*    (2006.01)
  *G06F 3/0488*  (2013.01)
  *H04R 1/02*    (2006.01)

(56) References Cited

U.S. PATENT DOCUMENTS

| | | | |
|---|---|---|---|
| 2013/0303096 A1 | 11/2013 | Foster | |
| 2013/0339850 A1* | 12/2013 | Hardi | G06F 3/016 715/702 |
| 2014/0036127 A1* | 2/2014 | Pong | H04R 1/028 348/333.01 |
| 2015/0106770 A1* | 4/2015 | Shah | H04M 1/64 715/863 |
| 2015/0124058 A1* | 5/2015 | Okpeva | H04R 1/1041 348/46 |

OTHER PUBLICATIONS

Extended European Search Report Application No. 16151514.3, dated Jun. 3, 2016, 8 pages.

* cited by examiner

HEADPHONES WITH INTEGRAL IMAGE DISPLAY

CROSS-REFERENCE TO RELATED APPLICATIONS

This application claims benefit of U.S. Provisional Patent Application Ser. No. 62/107,476, filed Jan. 25, 2015, which is hereby incorporated herein by reference in its entirety.

BACKGROUND

The present aspects described herein relate to audio headphones, and more specifically, to audio headphones that display information.

SUMMARY

According to various aspects, headphones include a first ear piece housing configured to be arranged relative to a first ear of a wearer, wherein the first ear piece housing includes a first driver configured to output acoustic signals. The headphones also include a second ear piece housing configured to be arranged relative to a second ear of the wearer, wherein the second ear piece housing includes a second driver configured to output acoustic signals. The headphones also include a first touch screen display arranged on an outward-facing surface of the first ear piece housing. The first touch screen display is configured to display a first image related to acoustic signals output by the first driver. The first touch screen display is also configured to receive a first tactile command from the wearer that controls at least one aspect of the acoustic signals.

According to various aspects, headphones include a first ear piece housing configured to be arranged relative to a first ear of a wearer, wherein the first ear piece housing includes a first driver configured to output acoustic signals. The headphones also include a second ear piece housing configured to be arranged relative to a second ear of the wearer, wherein the second ear piece housing includes a second driver configured to output acoustic signals. The headphones also include a first display screen arranged on an outward-facing surface of the first ear piece housing, wherein the first display screen is configured to display an image related to acoustic signals output by the first driver, and wherein at least on aspect of the first image indicates a status of the wearer.

According to various aspects, a wearable system includes a first audio driver configured to produce acoustic signals in response to receiving audio signals, wherein the first audio driver is arrangeable relative to a first ear of a wearer. The wearable system also includes a first display screen arranged relative to the first audio driver, wherein the first display screen faces away from the wearer when the audio driver is arranged relative to the first ear of the wearer. The wearable system also includes a controller configured to output audio signals to the first audio driver. The controller is also configured to output first images to the first display screen, wherein a first aspect of the first images is related to the output audio signals, and wherein a second aspect of the first images indicates a status of a wearer of the system.

DETAILED DESCRIPTION OF THE PREFERRED EMBODIMENTS

In the following, reference is made to aspects presented in this disclosure. However, the scope of the present disclosure is not limited to specific described aspects. Instead, any combination of the following features and elements, whether related to different aspects or not, is contemplated to implement and practice contemplated aspects. Furthermore, although aspects disclosed herein may achieve advantages over other possible solutions or over the prior art, whether or not a particular advantage is achieved by a given aspect is not limiting of the scope of the present disclosure. Thus, the following aspects, features, and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Figure 1:
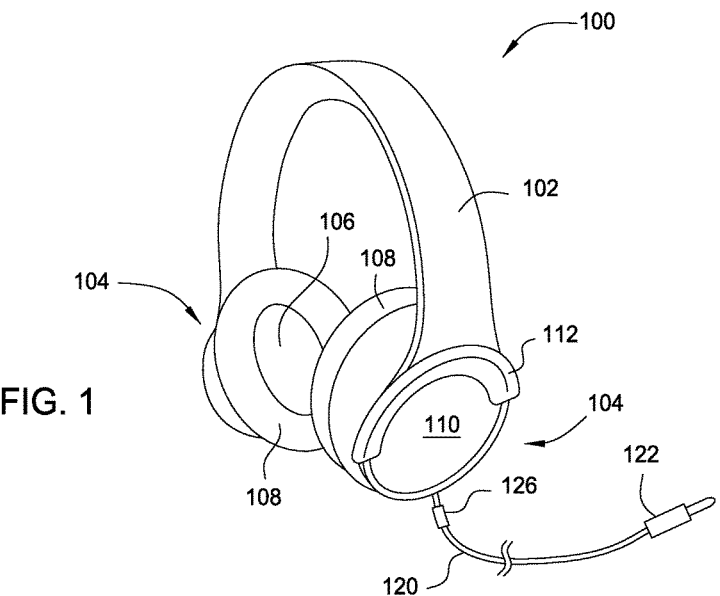
FIG. 1 is a perspective view of an embodiment of headphones with a display screen thereon according to various aspects descried herein.

With reference now to FIG. 1, headphones 100 according to various aspects include two ear piece housings 104 connected by a support member 102. The support member 102 can rest on a wearer's head to support the weight of the ear piece housings 104. In various embodiments, the support member 102 could be shaped so that the ear piece housings 104 are touching or in close proximity to each other when the headphones 100 are not being worn. To put on the headphones, a wearer would pull the ear piece housings 104 apart, resulting in the support member 102 applying a biasing force to the ear piece housings 104 that urges the ear piece housings 104 toward each other. The biasing force can press the ear piece housings 104 against the ears of the wearer to hold the headphones 100 in place on the wearer's head. In such instances, the support member 102 could rest on top of the wearer's head or behind the wearer's head, for example. The ear piece housings 104 can include an ear cushion 108. The ear cushion can be sized to fit on the wearer's ear or over the wearer's ear. In each case, the ear piece housing 104 is arranged relative to the wearer's ear so that audio signals output by the acoustic driver 106 (e.g., an acoustic transducer) are directed toward the ear of the wearer. As shown in FIG. 1, various aspects of headphones may include a yoke 112 disposed between the support member 102 and the ear piece housings 104. The ear piece housings 104 can pivot relative to the yoke 112 to enable a more-comfortable fit for different wearers. The headphones can include a cable 120 and a headphone jack 122 that can connect to a media player (e.g., an iPod®, a smart phone, or a tablet). The cable 120 can also include a microphone 126. If the headphones are connected to the wearer's smart phone, the microphone can enable the wearer to listen (via the acoustic drivers 106) and speak (via the microphone 126) to a telephone conversation, Skype® conversation, or the like. The headphones 100 can receive audio signals from the media player for the acoustic drivers 106 via the cable 120. The headphones 100 can also receive other types of data from the media player and send data, such as commands, to the media player via the cable 120. Various aspects of the headphones can omit the cable 120 and headphone jack 122 for a wireless connection (e.g., a Bluetooth® connection) to the media player.

The headphones 100 can include a display screen 110 arranged on an outward-facing surface of the ear piece housing 104. For example, the display screen 110 can be a liquid crystal display (LCD) mounted on an outward-facing surface of the ear piece housing 104. In various instances, the display screen 110 can be a touch screen display that can receive inputs based on a wearer (or other person) touching the display screen 110 in a particular manner. The inputs received on the display screen 110 can be transmitted to a processor or the like in the headphones 104 transmitted via the cable 120 and headphone Jack 122 (or the wireless connection) to a media player. Each of the two ear piece housings 104 can include a display screen 110 on its outward-facing surface. Alternatively, only one of the two ear piece housings 104 could include a display screen 110.

Figure 2:
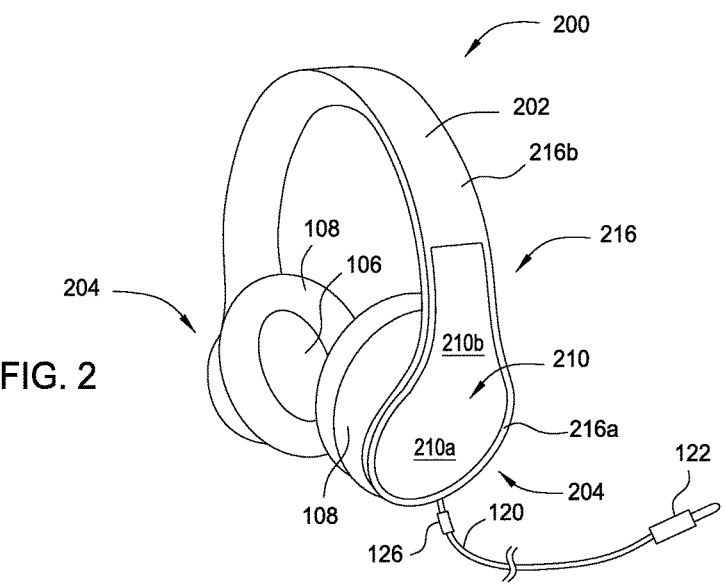
FIG. 2 is a perspective view of an embodiment of headphones with a display screen thereon according to various aspects described herein.

FIG. 2 illustrates an alternative embodiment for headphones 200 that includes two ear piece housings 204 connected by a support member 202. In this embodiment, the support member 202 and outward-facing surfaces of the ear piece housings 202 define a continuous surface 216. A display screen 210 could cover both a portion 216a of the continuous surface 216 over an ear piece housing 204 and a portion 216b of the continuous surface 216 of the support member. For example, the display screen 210 includes a first portion 210a arranged on the first portion 216a of the continuous surface 216, and the display screen 210 includes a second portion 210b arranged on the second portion 216b of the continuous surface 216. Again, in certain embodiments, each of the two ear piece housings 204 can include a display screen 210. In other embodiments, only one of the two ear piece housings 204 can include a display screen 210. In such embodiments, the screen 210 could be removable and interchangeable between the two ear piece housings 104. In either case, the display 210 could be mounted so as to be adjustable in one or more directions. For example, the display 210 could tilt in one or more directions relative to the housing 204. As another example, the display 210 could be slide or translate relative to the housing 204. Also, the second portion 210b of the display screen 210 could extend along the support member 202 by varying degrees. FIG. 2 illustrates the second portion 210b of the display screen 210 extending partially along the support member 202. In various other embodiments, the second portion 210b of the display screen 210 could extend further along the support member. For example, the second portion 210b of the display screen 210 for a first ear piece housing 204 could extend to a middle of the support member 202 such that it abuts a second portion 210b of a display screen 210 for a second ear piece housing 204. In various other embodiments, the display screen 210 could be a single display screen that is continuous from a first ear piece housing 204, along the support member 202, and to the second ear piece housing 204.

Figure 3A:
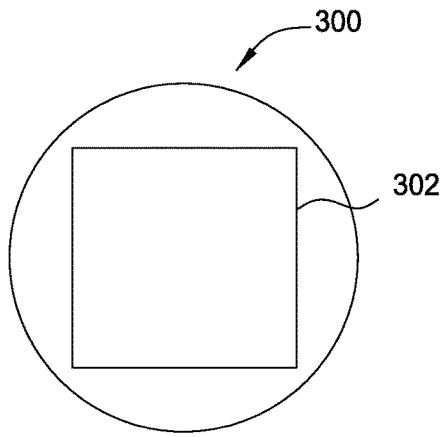
FIG. 3A is a side view of the display screen of FIG. 1 displaying album art for a song being listened to on the headphones.
Figure 3B:
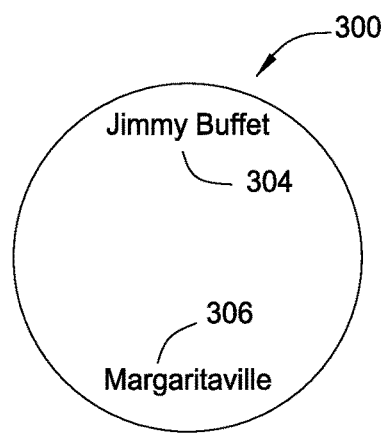
FIG. 3B is a side view of the display screen of FIG. 1 displaying the artist name and song title for a song being listened to on the headphones.

The display screens 110 and 210 can display information related to audio being listened to by the wearer and/or information about a status of the user. FIGS. 3A-3F illustrate various information that could be displayed by the display screens 110 and 210. FIG. 3A illustrates a display screen 300 that is displaying album art 302 for a song that the wearer is listening to. For example, the headphones may be connected to the media player (e.g., an iPod®, iPhone®, or like device), and the media player may send an image of the artwork to the headphones for display on the display screen 300. FIG. 3B illustrates a display screen 300 that is displaying an artist name 304 and a song title 306 for a song that the wearer is listening to. Again, the headphones may be connected to a media player that sends song information to the headphones for display on the display screen 300. In various instances, the display screen can include a dynamic image that changes with the music. For example, an image displayed on the display screens may move about the screen in a rhythmic manner that is timed to the rhythm of the song being listened to by the wearer. In instances in which a wearer is listening to stereo sound (wherein the sounds generated by the first audio driver 106 are different from sounds being generated by the second audio driver 108), the dynamic images on the display screens may differ to reflect the different sounds being generated. In various instances, the headphones may display a video that accompanies audio being heard by the wearer through the headphones. For example, the wearer may be watching a video on his smart phone. The video may be a movie stored on the smart phone or a music video streamed from YouTube®, for example. At least a portion of the video could be transmitted to the headphones and displayed on the display screens. In various instances, the headphones may display a video game being played by the wearer on his smart phone. The video image of the video game being played could be transmitted through the cord 120 to the headphones for display on the outward-facing display(s).

Certain smart phone applications enable a user to hear audio and/or watch video while receiving data related to the audio and/or video. For example, the Pittsburgh Penguins® hockey team has an application for the iOS operating system that enables a user to receive near-real-time score and player statistics data during a game while also receiving streaming audio of the play-by-play radio broadcast of the game. In various instances, the smart phone and/or the application could play the streaming audio over acoustic drivers 106 in the headphones 100 and 200. Furthermore, at least some of the data related to the game could be transmitted to the headphones 100 and 200 for display on the display screens 110 and 210. For example, the display screens 110 and 210 could display the score of the game that the wearer is listening to. As another example, if the wearer is playing a video game on a smart phone or other gaming device, audio related to the video game could be played by the acoustic drivers 106 in the headphones 100 and 200, and the wearer's score in the video game could be transmitted to the headphones 100 and 200 for display over the display screens 110 and 210.

Figure 3C:
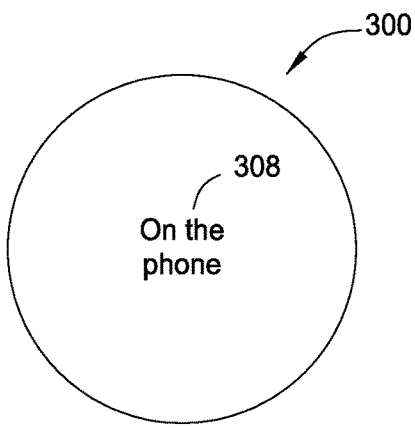
FIG. 3C is a side view of the display screen of FIG. 1 displaying a status of the wearer of the headphones, wherein the status is that the wearer is talking on the phone.
Figure 3D:
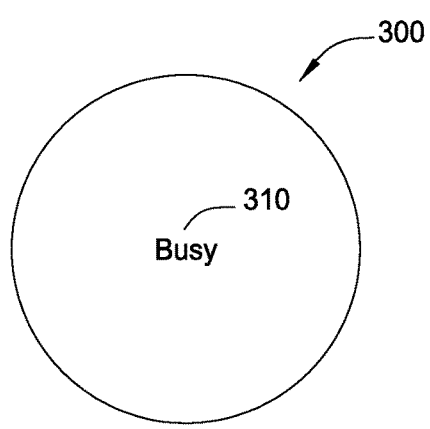
FIG. 3D is a side view of the display screen of FIG. 1 displaying a status of the wearer of the headphones, wherein the status is busy.
Figure 3E:
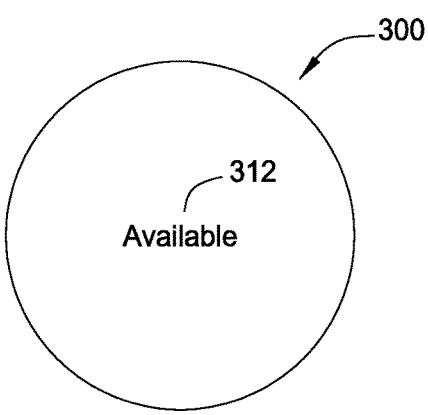
FIG. 3E is a side view of the display screen of FIG. 1 displaying a status of the wearer of the headphones, wherein the status is that the wearer is available.
Figure 3F:
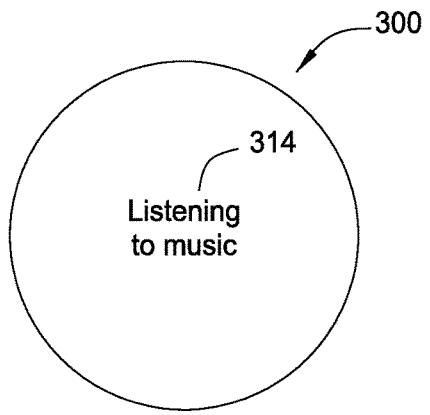
FIG. 3F is a side view of the display screen of FIG. 1 displaying a status of the wearer of the headphones, wherein the status is that the wearer is listening to music.

The headphones could also display a status of the wearer on the outward-facing display screens. FIGS. 3C-3F illustrate display screens that are displaying a status of the wearer. For example, FIG. 3C illustrates a display screen 300 with status text 308 that says "ON THE PHONE." In instances in which the headphones are connected to a smart phone of the user, the smart phone may send a signal to the headphones indicating that the smart phone is connected for a telephone call. The signal may prompt the headphones to display the "ON THE PHONE" status text 308 on the display screen 300. FIG. 3D illustrates a display screen 300 with status text 310 that says "BUSY." In instances in which the wearer is listening to music, watching a movie on his smart phone, playing a game on his smart phone, or the like, the smart phone may send a signal to the headphones indicating that the smart phone is currently playing music, playing a movie, or executing a game application. The signal may prompt the headphones to display the "BUSY" status text 310 on the display screen 300. In other instances, the wearer may be able to prompt the headphones (e.g., through a command on the smart phone or a touch command on the display screen, described in greater detail below) to display the "BUSY" status text 310 on the display screen 300. As another example, FIG. 3E illustrates a display screen 300 with status text 312 that says "AVAILABLE." In instances in which the wearer is wearing the headphones but is not listening to music, watching a movie, playing a game, or the like, the smart phone or other media player may send a signal indicating that the wearer is not currently engaged in any activities that would use the headphones. The signal may prompt the headphones to display the "AVAILABLE" status text 310 on the display screen 300. In various other instances, the wearer may be able to prompt the headphones two display the "AVAILABLE" status text 312 on the display screen 300. FIG. 3F illustrates a display screen 300 with status text 314 that says "LISTENING TO MUSIC." In instances in which the wearer is listening to music, a connected media player could send a signal to the headphones indicating that the media player is playing music. The signal prompts the headphones to display the "LISTENING TO MUSIC" status text 314 on the display screen 300. The signal could be an audio signal of the music from the media player to the headphones. Similar status displays could be included for a wearer watching a movie or playing the game. In instances in which the wearer is playing a game the status display could include game information, such as the title of the game, the wearer's score, the wearer's level in the game, or the like. In various instances, the display screens 110 and 210 could display a message from the wearer, such as "WORLD PEACE" or "BUZZ OFF."

Figure 4A:
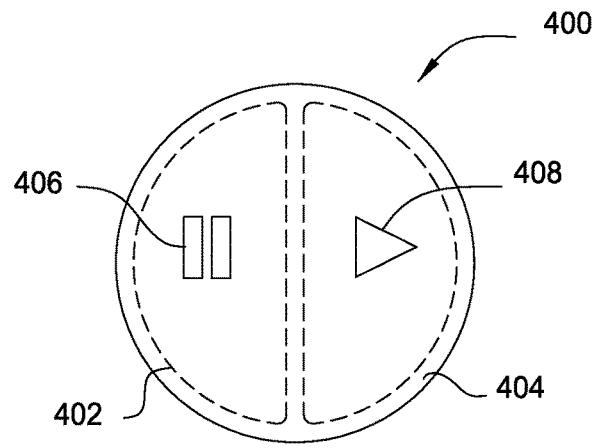
FIG. 4A is a side view of the display screen of FIG. 1, wherein the display screen is a touch screen display and illustrated as having two side-by-side touch regions that enable control of playback of audio through the headphones.
Figure 4B:
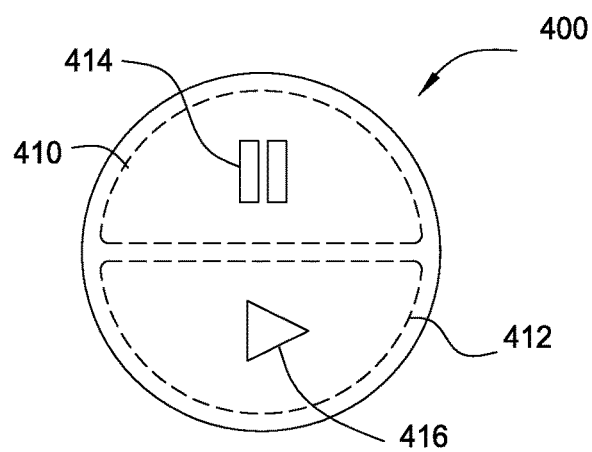
FIG. 4B is a side view of the display screen of FIG. 1, wherein the display screen is a touch screen display and illustrated as having two top and bottom touch regions that enable control of playback of audio through the headphones.

As discussed above, in various embodiments, the display screen 110 or 210 is a touch screen display, and the wearer (or other person) provides inputs to the headphones by touching the display screen. FIG. 4A illustrates a touch screen display 400 that includes two touch regions 402 and 404 on the display. The first touch region 402 is associated with a pause command, and the touch screen display 400 may display a pause icon 406 in the first touch region 402. The second touch region 404 is associated with a play command, and the touch screen display 400 may display a play icon 408 in the second touch region 404. If the wearer touches the display screen 400 in the first region 402, then the headphones receive a "pause" input and can send a "pause" command to a connected media player (e.g., via the cable 120). Similarly, if the wearer touches the display screen 400 in the second region 404, then the headphones receive a "play" input and can send a "play" command to a connected media player. In various embodiments, the wearer may be able to configure the touch regions to accommodate personal preferences. For example, FIG. 4B illustrates the touch screen display 400 in which two touch regions 410 and 412 have been arranged on top of each other, rather than side-by-side. Again, the first touch region 410 is associated with a pause command, and the touch screen display 400 may display a pause icon 414 in the first touch region 410. The second touch region 412 is associated with a play command, and the touch screen display 400 may display a play icon 416 in the second touch region 412.

Figure 4C:
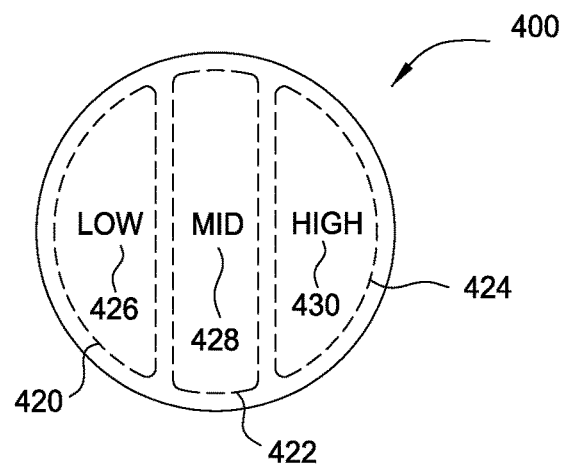
FIG. 4C is a side view of the display screen of FIG. 1, wherein the display screen is a touch screen display and illustrated as having three side-by-side touch regions that enable control of low frequency, mid-frequency, and high-frequency equalization.

FIG. 4C illustrates a touch screen display 400 that includes three touch regions 420, 422, and 424 arranged side-by-side to adjust frequency equalization of sound being played. For example, the first touch region 420 can be associated with a low-frequency range, and the touch screen display 400 may include a "low" text 426 in the first touch region 420. If the wearer slides a finger along the first touch region 420 in a vertically upward direction, then the headphones receive an "increase" input and can increase the volume of low-frequency sounds. For example, the headphones may include an internal frequency equalizer that adjusts the sound received from a media player. As another example, the headphones may send the command to the media player to adjust the frequencies of the sounds being output to the headphones. If the wearer slides a finger along the first touch region 420 in a vertically downward direction, then the headphones receive a "decrease" input, and can decrease the volume of low-frequency sounds. A second touch region 422 can be associated with a mid-frequency range, and the touch screen display 400 may include a "mid" text 428 in the second touch region 422. If the wearer slides a finger along the second touch region 422 in a vertically upward direction, then the headphones receive an "increase" input and can increase the volume of mid-frequency sounds. If the wearer slides a finger along the second touch region 422 in a vertically downward direction, the headphones receive a "decrease" input, and can decrease the volume of mid-frequency sounds. The third touch region 424 can be associated with a high-frequency range, and a touch screen display 400 may include a "high" text 430 in the third touch region 424. If the wearer slides a finger along the third touch region 424 in a vertically upward direction, then the headphones receive an "increase" input into increase the volume of high-frequency sounds. If the wearer slides a finger along the third touch region 424 in a vertically downward direction, the headphones receive a "decrease" input and can decrease the volume of high-frequency sounds. In various instances, the touch screen display 400 could assign touch regions based on where the wearer places his fingers on the display 400. Continuing the above example, the touch screen display 400 could detect that the wearer has placed three fingers on the display 400. In such instances, the touch screen display 400 could assign a region under a first finger as the first touch region 420, a region under the second finger as the second touch region 422, and a region under the third finger 424 as the third touch region.

In various instances, the wearer can customize the touch screens. For example, the wearer could select which inputs can be provided through the touch screen. The wearer could choose to provide inputs that would play an audio track, stop an audio track, pause an audio track, fast forward in an audio track, rewind in an audio track, skip to the next audio track, and/or return to a previous audio track, for example. The wearer could also choose to provide inputs that would increase the volume of audio being played, decrease the volume of audio being played, and/or activate/deactivate active noise cancelling in the headphones. As another example, the wearer could choose to provide inputs to adjust a virtual sound stage of the headphones. For example, LiveStage® technology by Harman® can adjust output by the acoustic transducers 106 to mimic the sounds of speakers arranged at different distances and/or angles relative to the wearer. The touch screen displays 400 could be used to adjust the positioning of these virtual speakers. For example, the wearer could pinch two fingers together on the touch screen display 400 to move the location of the virtual speaker further away or spread two fingers apart on the touch screen display 400 to move the location of the virtual speaker closer. As another example, the wearer could swipe a finger across each touch screen display 400 in a direction toward the wearer's face to move the location of the virtual speakers toward the front of the wearer. The wearer could also adjust what regions of the touch screens are touched to provide the different inputs.

In various embodiments, the user could provide other gestures, taps, or the like to provide inputs to the headphones. For example, the wearer could apply two fingers to the touch screen display 400 and rotates the finger in a clockwise direction on the touch screen display 400 to provide an "increase the volume" inputs to the headphones. Similarly, the wearer could apply two fingers to the touch screen display 400 and rotate the fingers in a counterclockwise direction on the touch screen display 400 to provide a "decrease the volume" input to the headphones. Similarly, the wearer could swipe a finger from a back of the touch screen display 400 toward a front of the touch screen display 400 (relative to the wearer's head) to skip to the next song track. The wearer could also swipe the finger from the front of the touch screen display 400 to the back of the touch screen display 402 skip back to a previous song track. In various embodiments that include a touch screen display on each of the two ear piece housings, the wearer may provide inputs to the headphones by touching only a first one of the two touch screen displays, by touching only a second one of the two touch screen displays, or by simultaneously touching both touch screen displays. For example, the wearer may play or pause music by tapping the first touch screen display. The wearer may accept a phone call or terminate a phone call by tapping the second touch screen display. The user may adjust the frequency equalization (described above with respect to FIG. 4C) by touching the first touch screen display and simultaneously sliding a finger along the second touch screen display as described with respect to FIG. 4C. The above-described inputs are examples only. Other touches, gestures, or combination thereof are contemplated within this disclosure.

Figure 5:
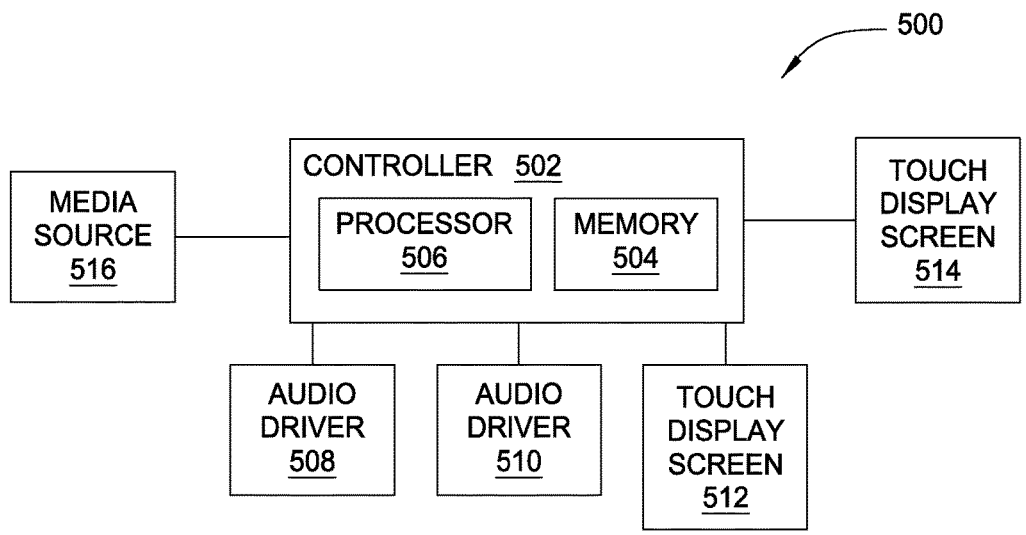
FIG. 5 is a block diagram of a controller for controlling headphones that incorporate a touch screen display.

FIG. 5 illustrates a block system diagram of headphones 500 according to various aspects. The headphones 500 include a controller 502. The controller 502 includes a computer processor 506 and memory 504. The controller 502 can be in communication with a media source 516, such as an iPod®, iPhone®, or other smart phone. The controller 502 can receive audio signals for playback by the first audio driver 508 and the second audio driver 510. In various instances, the controller 502 can also send commands to the media player 516 (e.g., play, pause, except phone call, terminate phone call, etc.). The controller 502 is in communication with the first audio driver 508 and the second audio driver 510 to transmit audio signals from the media source 516 for playback to the wearer. The controller 502 is also in communication with a first touch screen display 512 and a second touch screen display 514. The controller 502 can send images for display to the touch screen displays 512 and 514. The controller 502 can also receive inputs from the touch screen displays 512 and 514. As described above, the inputs can be generated by the wearer touching one or both of the touch screen displays 512 and 514. The memory 504 can store executable program code that is executed by the processor 506, images for display on the touch screen displays 512 and 514, and user preferences associated with touch regions, for example.

Figure 6:
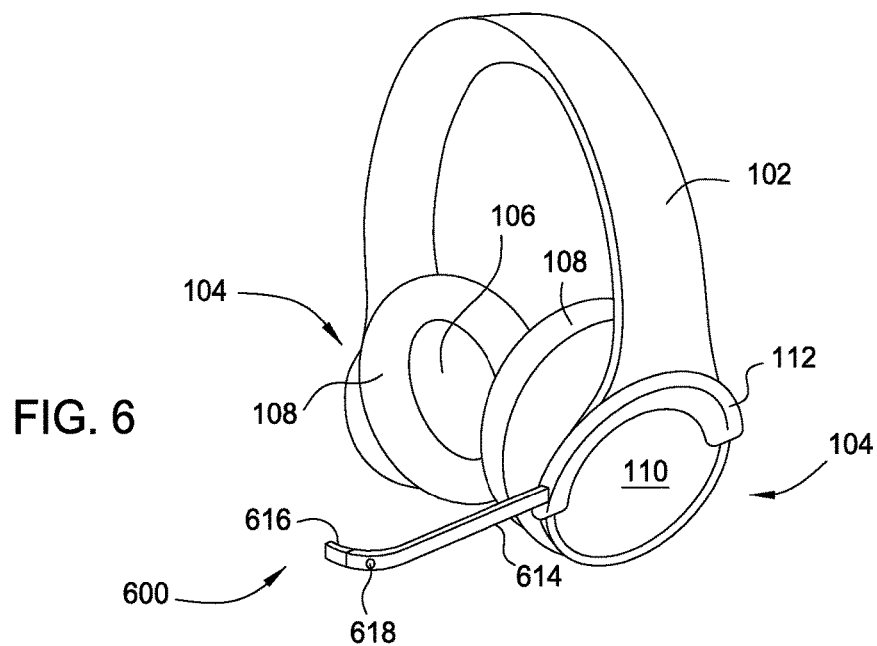
FIG. 6 is a perspective view of headphones with a first display screen thereon and a second display screen arranged relative to a wearer's eye.

FIG. 6 illustrates an embodiment of headphones 600 that include a display screen 616 arranged in a field of view of the wearer. Examples of such a display screen 616 include Google® Glass® and the like. The display screen 616 can be attached to the headphones 600 by a boom 614. In such embodiments, the display screen 110 of the headphones 600 could display images related to information being viewed by the wearer on the display screen 616. For example, if the wearer is watching a video on the display screen 616, then the display screen 110 on the ear piece housing 104 could display a title of the video, a still shot of the video, or the like. The display screen 110 could display a duplicate copy of the video being watched by the wearer on the display screen 616. In various instances, display screens 616 such as Google® Glass® incorporate an outward-facing camera 618 that the wearer can use to record photographs or videos of his surroundings. In instances in which the wearer is using the camera 618, the display screens 110 on the ear piece housings 104 could display an image or images of the photo or video being captured by the camera 618.

Figure 7:
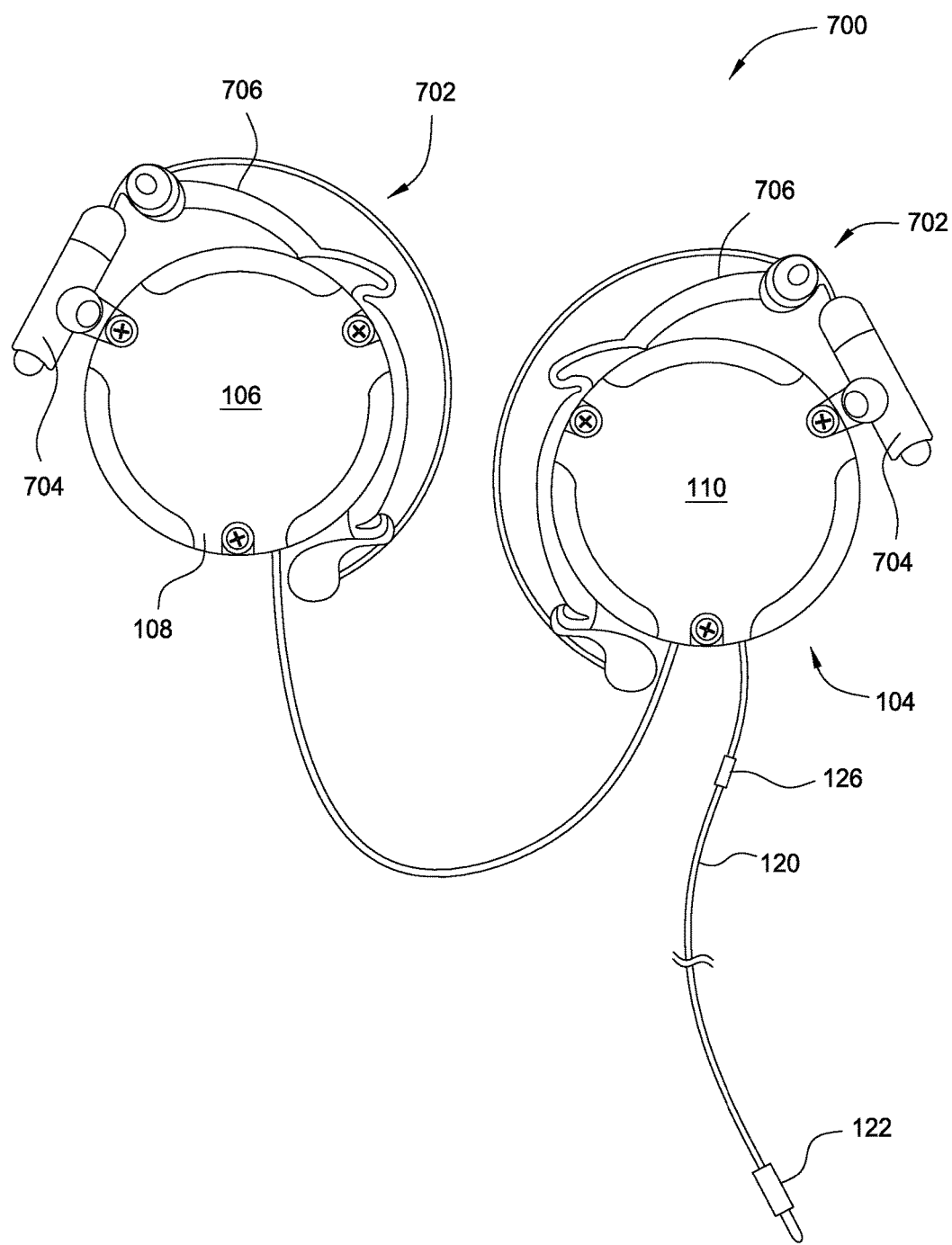
FIG. 7 is a perspective view of headphones with a first display screen mounted on an ear piece housing, wherein the ear piece housings are not connected together by a support member.

In various instances, headphones can be provided without a support member that connects the two ear piece housings. FIG. 7 illustrates headphones 700 that do not include a support member that connects the two ear piece housings 104. Each ear piece housing 104 includes a pineal support member 706 attached to the ear piece housing 104. The pineal support member 706 may be attached to the ear piece housing 104 by a bracket 704. The bracket 704 can enable the pineal support member 706 to move relative to the ear piece housing 104. The pineal support member 706 can be positioned over and/or behind the pinna of the wearer's ears to support the weight of the ear piece housings 104 and position the acoustic drivers 106 relative to the wearer's ears.

The descriptions of the various aspects have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Aspects described herein may take the form of an entirely hardware embodiment, an entirely software embodiment (including firmware, resident software, micro-code, etc.) or an embodiment combining software and hardware aspects that may all generally be referred to herein as a "circuit," "module" or "system."

Various aspects may be a system, a method, and/or a computer program product. The computer program product may include a computer readable storage medium (or media) having computer readable program instructions thereon for causing a processor to carry out aspects described herein.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the aspects described herein may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects described herein.

Aspects are described herein with reference to flowchart illustrations and/or block diagrams of methods, apparatus (systems), and computer program products. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various aspects. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to various embodiments, other and further embodiments may be devised without departing from the basic scope thereof, and the scope thereof is determined by the claims that follow.

What is claimed is:

1. Headphones, comprising:
a first ear piece housing configured to be arranged to a first ear of a wearer, wherein the first ear piece housing includes a first driver configured to output acoustic signals;
a second ear piece housing configured to be arranged to a second ear of the wearer, wherein the second ear piece housing includes a second driver configured to output acoustic signals;
a first touch screen display arranged on an outward-facing surface of the first ear piece housing, wherein the first touch screen display is configured to display a first image related to acoustic signals output by the first driver, and wherein the first touch screen display includes a first touch region configured to receive a first tactile command and a second touch region configured to receive a second tactile command that each controls at least one aspect of the acoustic signals; and
a second touch screen display arranged on an outward-facing surface of the second ear piece housing, wherein the second touch screen display is configured to receive a third tactile command from the wearer, and the first tactile command and the third tactile command are performed simultaneously to provide a fourth tactile command.

2. The headphones of claim 1, wherein the first tactile command includes at least one of:
a command to change the volume of the acoustic signals;
a command to pause the acoustic signals; and
a command to play the acoustic signals.

3. The headphones of claim 1, wherein the first tactile command includes a command to adjust a frequency spectrum of the acoustic signals.

4. The headphones of claim 1, further comprising a transceiver in communication with a mobile telephone; and
wherein the first tactile command includes a command to pause the acoustic signals, accept an incoming telephone call, and play audio from the incoming telephone call via the first driver.

5. The headphones of claim 1, wherein the second touch screen display is configured to display a second image related to acoustic signals output by the second driver, and wherein the third tactile command from the wearer controls at least one aspect of the acoustic signals.

6. The headphones of claim 5, wherein the first image and the second image are different.

7. The headphones of claim 1, wherein at least an aspect of the first image indicates a status of the wearer.

8. The headphones of claim 1, further comprising a support member that connects to the first ear piece housing and the second ear piece housing, wherein the support member supports the first ear piece housing and the second ear piece housing, and wherein the first touch screen display extends onto the support member.

9. Headphones, comprising:
a first ear piece housing configured to be arranged to a first ear of a wearer, wherein the first ear piece housing includes a first driver configured to output acoustic signals;
a second ear piece housing configured to be arranged to a second ear of the wearer, wherein the second ear piece housing includes a second driver configured to output acoustic signals;
a first display screen arranged on an outward-facing surface of the first ear piece housing, wherein the first display screen is configured to display an image related to acoustic signals output by the first driver, wherein the first display screen includes a first touch region configured to receive a first tactile command and a second touch region configured to receive a second tactile command that each controls at least one aspect of the acoustic signals, and wherein at least on aspect of the first image indicates a status of the wearer; and
a second display screen arranged on an outward-facing surface of the second ear piece housing, wherein the second display screen is configured to receive a third tactile command, and the first tactile command and the third tactile command are performed simultaneously to provide a fourth tactile command.

10. The headphones of claim 9, wherein the indicated status of the wearer is selected from a group consisting of:
listening to music;
talking on the telephone;
does not want to be disturbed; and
willing to be interrupted.

11. The headphones of claim 9, wherein the at least one aspect of the first image comprises a color of the image.

12. The headphones of claim 9, wherein the at least one aspect of the first image comprises an icon displayed on the display screen.

13. The headphones of claim 9, further comprising a support member that connects to the first ear piece housing and the second ear piece housing, wherein the support member supports the first ear piece housing and the second ear piece housing, and wherein the display screen extends onto the support member.

14. A wearable system, comprising:
a first ear piece housing configured to be arranged to a first ear of a wearer, wherein the first ear piece housing includes a first audio driver configured to produce acoustic signals in response to receiving audio signals;
a second ear piece housing configured to be arranged to a second ear of the wearer, wherein the second ear piece housing includes a second driver configured to output acoustic signals;
a first display screen arranged on an outward-facing surface of the first ear piece housing, wherein the first display screen includes a first touch region configured to receive a first tactile command and a second touch region configured to receive a second tactile command that each controls at least one aspect of the acoustic signals;
a second display screen arranged on an outward-facing surface of the second ear piece housing, wherein the second display screen is configured to receive a third tactile command, and the first tactile command and the third tactile command are performed simultaneously to provide a fourth tactile command; and
a controller configured to:
output audio signals to the first audio driver; and
output first images to the first display screen, wherein a first aspect of the first images is related to the output audio signals, and wherein a second aspect of the first images indicates a status of a wearer of the system.

15. The wearable system of claim 14, wherein the controller is further configured to output second images to the second display screen, and wherein a third aspect of the first images is related to the output second images.

16. The wearable system of claim 14, wherein the controller is further configured to:
   output audio signals to the second audio driver; and
   output second images to the second display screen, wherein a first aspect of the second images is related to the output audio signals, and wherein a second aspect of the second images indicates a status of the wearer of the system.

17. The wearable system of claim 16, wherein the first display screen and the second display screen comprise touch-sensitive regions, wherein the controller is further configured to receive touch signals from the first and second display screens, and wherein the controller is further configured to control the output of audio signals to the first audio driver and the second audio driver in response to the received touch signals.

18. The wearable system of claim 17, wherein the controller is configured to:
   provide a first control of the output of audio signals based on a touch signal from the first display screen;
   provide a second control of the output of audio signals based on a touch signal from the second display screen; and
   provide a third control of the output of audio signals based on simultaneous touch signals from the first display screen and the second display screen.

* * * * *